(12) United States Patent
Wetzel et al.

(10) Patent No.: US 8,611,076 B2
(45) Date of Patent: Dec. 17, 2013

(54) MULTI-POSITIONAL STAND AND UNDER CABINET MOUNT FOR A TABLET COMPUTER

(75) Inventors: Shelley Anne Wetzel, Frederick, MD (US); Mark Steven Palmquist, Frederick, MD (US)

(73) Assignee: Autumn Horizons, Inc., Frederick, MD (US)

( * ) Notice: Subject to any disclaimer, the term of this patent is extended or adjusted under 35 U.S.C. 154(b) by 76 days.

(21) Appl. No.: 12/929,306

(22) Filed: Jan. 13, 2011

(65) Prior Publication Data

US 2012/0182680 A1    Jul. 19, 2012

(51) Int. Cl.
*G06F 1/16* (2006.01)

(52) U.S. Cl.
USPC ...... 361/679.06; 248/126; 248/127; 248/121; 248/248; 248/558

(58) Field of Classification Search
USPC ........ 361/679.06, 679.27; 248/372.1, 123.11, 248/558, 126, 127, 121, 447.1, 454, 918, 248/919; D14/239
See application file for complete search history.

(56) References Cited

U.S. PATENT DOCUMENTS

| | | |
|---|---|---|
| 5,915,661 A | 6/1999 | Silverman et al. |
| 6,047,939 A | 4/2000 | Kim |
| 6,186,459 B1 | 2/2001 | Ma |
| 6,340,146 B1 | 1/2002 | Tzeng |
| 6,361,012 B1 | 3/2002 | Chang |
| 6,464,185 B1 | 10/2002 | Minelli et al. |
| 6,543,734 B2 | 4/2003 | Yeh |
| 6,557,812 B2 | 5/2003 | Kutzehr et al. |
| 6,667,759 B2 | 12/2003 | Gerszberg et al. |
| D495,337 S | 8/2004 | Zerman et al. |
| 6,856,506 B2 | 2/2005 | Doherty et al. |
| D507,477 S | 7/2005 | Pfister |
| 6,962,314 B2 | 11/2005 | Hsu |
| 7,028,961 B1 | 4/2006 | Dittmer et al. |
| D520,017 S | 5/2006 | van Kuijk |

(Continued)

*Primary Examiner* — Jayprakash N Gandhi
*Assistant Examiner* — Hung Dang
(74) *Attorney, Agent, or Firm* — Bejin VanOphem & Bieneman PLC

(57) ABSTRACT

A multi-positional stand and under-cabinet mount for a tablet computer comprising a mounting plate, a hinge member, a base member, a hinge pin, 2 cam-actuated handles, a base mount and an attachment knob. The mounting plate can be temporarily coupled to the center of the back of a tablet computer with hook-and-loop (or similar) two-part, fastening material (of prior art). The mounting plate can be rotationally attached to the flat face on the top front of the hinge member allowing the attached tablet computer to rotate. The bottom of the hinge member can be pivotally attached to the front of the base member with the hinge pin oriented horizontally allowing the recline angle of said tablet computer to be adjusted. The angular position of the hinge member and base member can be locked in place, in any one of an infinite number of angular positions within a range, by the manipulation of the 2 cam-actuated handles. The hinge member can fold down on top of the base member and the cam actuated handles can fold towards the base member for a compact, portable configuration. The base mount can attach to the bottom of a cabinet or shelf with screws. The stand can be temporarily mounted to the base mount (in an upside-down position) with an attachment knob and can be manipulated, touch, rotated, tilted left or right, or forward and back, or fully retracted underneath the cabinet or shelf.

14 Claims, 16 Drawing Sheets

(56) References Cited

U.S. PATENT DOCUMENTS

| | | |
|---|---|---|
| 7,296,752 B2 | 11/2007 | Carnevali |
| 7,296,774 B2 | 11/2007 | Oh |
| 7,317,611 B2 | 1/2008 | Dittmer |
| D563,399 S | 3/2008 | Wohlford et al. |
| 7,513,468 B2 * | 4/2009 | Jung et al. ............ 248/133 |
| D591,756 S | 5/2009 | Wohlford et al. |
| D605,185 S | 12/2009 | Russell |
| 7,694,919 B2 * | 4/2010 | Lee ............ 248/123.11 |
| 7,694,929 B2 * | 4/2010 | Jang ............ 248/372.1 |

* cited by examiner

MULTI-POSITIONAL STAND AND UNDER CABINET MOUNT FOR A TABLET COMPUTER

FIELD OF INVENTION

This invention relates to a multi-positional, portable tabletop stand and under cabinet/shelf mount for a tablet computer.

DESCRIPTION OF PRIOR ART

Since tablet computers are a new invention there is not much prior art for tablet computer stands. Most of the prior art pertains to mounting systems for computer monitors, television screens, cell phones, DVD players and GPS units. U.S. Pat. No. 6,340,146, by Tzeng, is a swing down mounting system for an LCD screen in which the screen can lock in one of a series of angular positions. U.S. Pat. No. 7,028,961, by Dittmer et al., is a mounting system for a flat screen which is designed to attach to a wall and allows the screen to be pivoted both horizontally and vertically within a range, however, it is not designed to be portable or sit on a horizontal surface. U.S. Pat. No. 6,962,314, by Hsu, is a multifunctional holder designed to clamp securely to surface, but does not specify screen rotation. U.S. Pat. No. 5,915,661 by Silverman et al. is a collapsible desk stand for a portable computer, but does not mount under a cabinet or allow for limitless screen rotation. U.S. Pat. No. 6,361,012, by Chang, is a television mount for a vehicle that allows the television to pivot down and pivot left or right, but does not allow for screen rotation and is not designed to be used on a desktop. U.S. Pat. No. 7,317,611, by Dittmer, is designed to mount under a cabinet and pivot from an extended position to a folded position and relies on friction to remain in a static position, however, the mount does not allow for screen rotation and is not intended for use on a desk top. U.S. Pat. No. 6,186,459, by Ma, is an angle and direction adjustable display device but is not designed to be portable. U.S. Pat. No. 6,557,812 B2, by Kutzehr et al., is a mount assembly for a screen that pivots and turns, but is not portable.

BACKGROUND OF THE INVENTION

Portable tablet computers that allow users to connect to the Internet and to access e-mail and to view the screen in both a landscape (horizontal) and portrait (vertical) orientation are a recent development. Software developed for these tablet computers often function by having the user actively tilt or rotate the screen at varying degrees and speeds which interact with a built in accelerometer. Although these computers are designed to be hand held, there are times when it is desirable to be able to view and rotate or tilt the tablet computer without the user having to holding it up with his or her arms. There are several new stands that have been designed to hold these new tablet computers. Some of them sit on a horizontal surface and are designed to be portable and collapsible, but don't allow for screen rotation by touch. Some of these new stands allow the tablet computer to tilt and allow the screen to rotate but do not allow for the stand to be mounted to the bottom of a shelf or cabinet. Some of these new stands are designed to mount the tablet computer to a fixed vertical surface, such as a wall, or under a horizontal surface, such as a cabinet or shelf, but are not portable. Some of these new stands can be incrementally tilted backwards or fixed in a specified number of reclined positions, but don't allow the recline angle to be locked in all possible angular positions between fully vertical and fully horizontal.

There is a need for one design that is both a multi-positional, portable desktop stand with screen rotation, and, a multi-positional under cabinet or under shelf mount for a tablet computer.

Furthermore, many existing stands and mounts attach to the edges or corners of the tablet computers where there are often buttons and jacks. There is a need for a stand and mount that attaches to the center of the back surface of a tablet computer so that the mount or stand does not interfere with the placement of the buttons and jacks on the edges of the tablet computer. Also, there is a need for a stand and mount that attaches to the center of the back surface of a tablet computer so that it can be used with tablet computers of differing dimensions and proportions without the need for an adapter surface designed specifically for a particular tablet computer.

BRIEF SUMMARY OF THE INVENTION

The Multi-positional Stand and Under Cabinet Mount for a Tablet Computer, currently described herein, is developed to meet the need for a stand that can sit on a flat, horizontal surface and allows for a tablet computer to be temporarily attached to it allowing full rotation of the tablet computer about an axis running centered on the face of and perpendicular to its face, therefore, allowing the tablet computer to be in both a portrait (vertical) and a landscape (horizontal) position, and in every position in between. Furthermore, the stand has been designed to mount (upside down) to the bottom of a kitchen cabinet so that the attached tablet computer can be viewed, touched and manipulated in a kitchen without using counter space. Furthermore, while mounted to the bottom of a cabinet the stand has been designed to tilt back and up so that it is parallel with and close to the bottom surface of the cabinet so that counter space directly below the stand is fully accessible by the user. Furthermore, the stand has been designed to mount to the bottom (or top) of a shelf or other fixed horizontal surface so that the attached tablet computer can be viewed, touched and manipulated in an office or in a workroom without obstructing desk or work table space below. When useful, the stand and mount can also be attached to the side of a cabinet, or to a wall.

The invention provides for means for attaching the back center surface of a prior art tablet computer to a mounting plate with prior art two-part hook-and-loop fastener material or a two-part prior art mushroom-type fastener material, or any other prior art material, so that the computer can be repeatedly removed and then re-attached to the mounting plate manually and without the use of tools. The invention provides for the mounting plate to be rotationally attached to the top portion of the front surface of a hinge member.

The bottom portion of the hinge member is furthermore pivotally attached to the front of the base member. The angular position of the hinge member and base member can be locked or unlocked in any one of an infinite number of angular positions within a range by the manual rotation of 2 cam-actuated handles. The cam-actuated handles are designed so that when they are manually pivoted and point away from the base member the cam surfaces on the cam-actuated handles squeeze the surfaces of the hinge member and base member together and therefore lock the position. The invention provides for lock washers between the contacting surfaces of the hinge member and the base member to help create more friction and a stronger lock so that the tablet computer, being attached to the stand, can be poked with a user's fingers without causing a change in the angular position of the hinge member with respect to the base member. Furthermore, the cam-actuated handles are designed so that when they are manually pivoted towards (parallel to) the base member the cam surfaces on the cam-actuated handles move away from the surfaces of the hinge member and base member and allow for the hinge member and base member to freely pivot with respect to each other.

The invention provides for a hinge pin and two partially-threaded locking pins that fix the distance between the two cam-actuated handles about their centers of pivot. The hinge pin goes through holes in the sides of the bottom ends of the hinge member and through a hole in the sides of the front portion of the base member. The cam-actuated handles provide the secondary purpose of stabilizing the stand when they are extended and in a locked position. The invention provides for a base mount that has a top edge that can be attached to a flat horizontal or vertical surface with screws, and has a bottom surface to which the underside of the base member can be temporarily attached. The invention provides for a slot to be cut through the central portion of the base member, running top to bottom and orientated depthwise. The invention provides for the base mount to have a hex-head screw affixed to and extending out from its outer surface. The hex head screw can pass through the slot on the base member. The invention provides for the stand to be temporarily attached to the base mount with a threaded attachment knob which threads onto the base mount's hex-head screw, therefore, sandwiching the base member in place. The invention provides for rotation between the bottom surface of the base member and the bottom surface of the base mount about an axis that passes through the length of the hex-head screw so that the screen of the tablet computer can turn sideways when the user is not standing directly in front of the cabinet or shelf under which the stand is attached.

The invention provides for the hinge member to fold down on top of the base member (rotating about the hinge pin) and for the pivot arms to fold in beside the hinge member (rotating about the partially-threaded locking pins) for a compact and portable configuration.

Other systems, methods, features and advantages of the invention will be or will become apparent to one with skill in the art upon examination of the following figures and detailed description. It is intended that all such additional systems, methods, features and advantages be included within the description, be within the scope of the invention, and be protected by the accompanying claims.

BRIEF DESCRIPTION OF THE SEVERAL VIEWS OF THE DRAWINGS

The invention can be understood with reference to the following figures. The components in the figures are not necessarily to scale, emphasis instead being placed upon illustrating the principles of the invention.

DETAILED DESCRIPTION OF THE INVENTION

Figure 1:
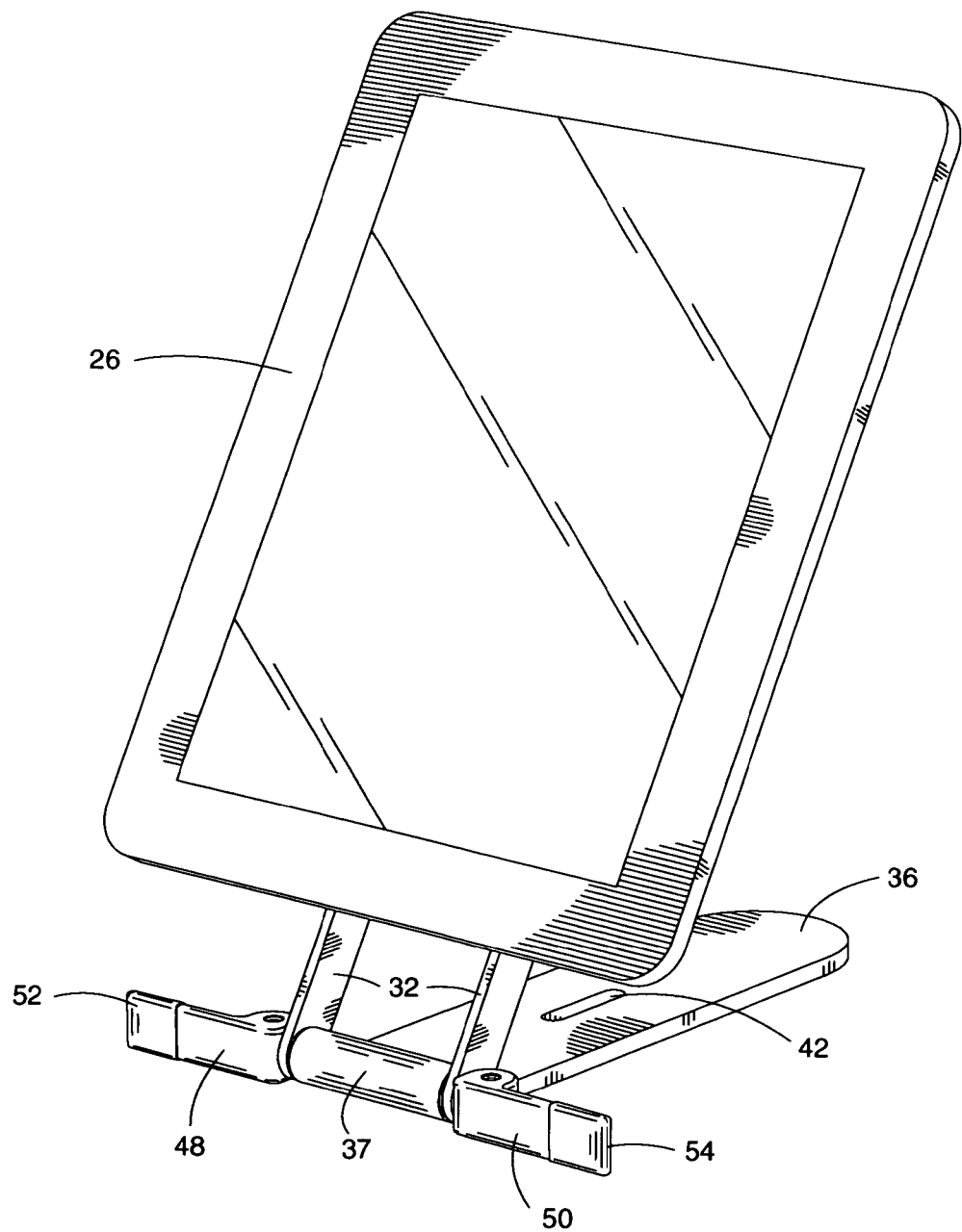
FIG. 1 illustrates a perspective front view of an exemplary embodiment of the stand shown resting on a horizontal surface and with an attached tablet computer in a portrait (vertical) orientation and locked in a slightly backward leaning position.
Figure 2:
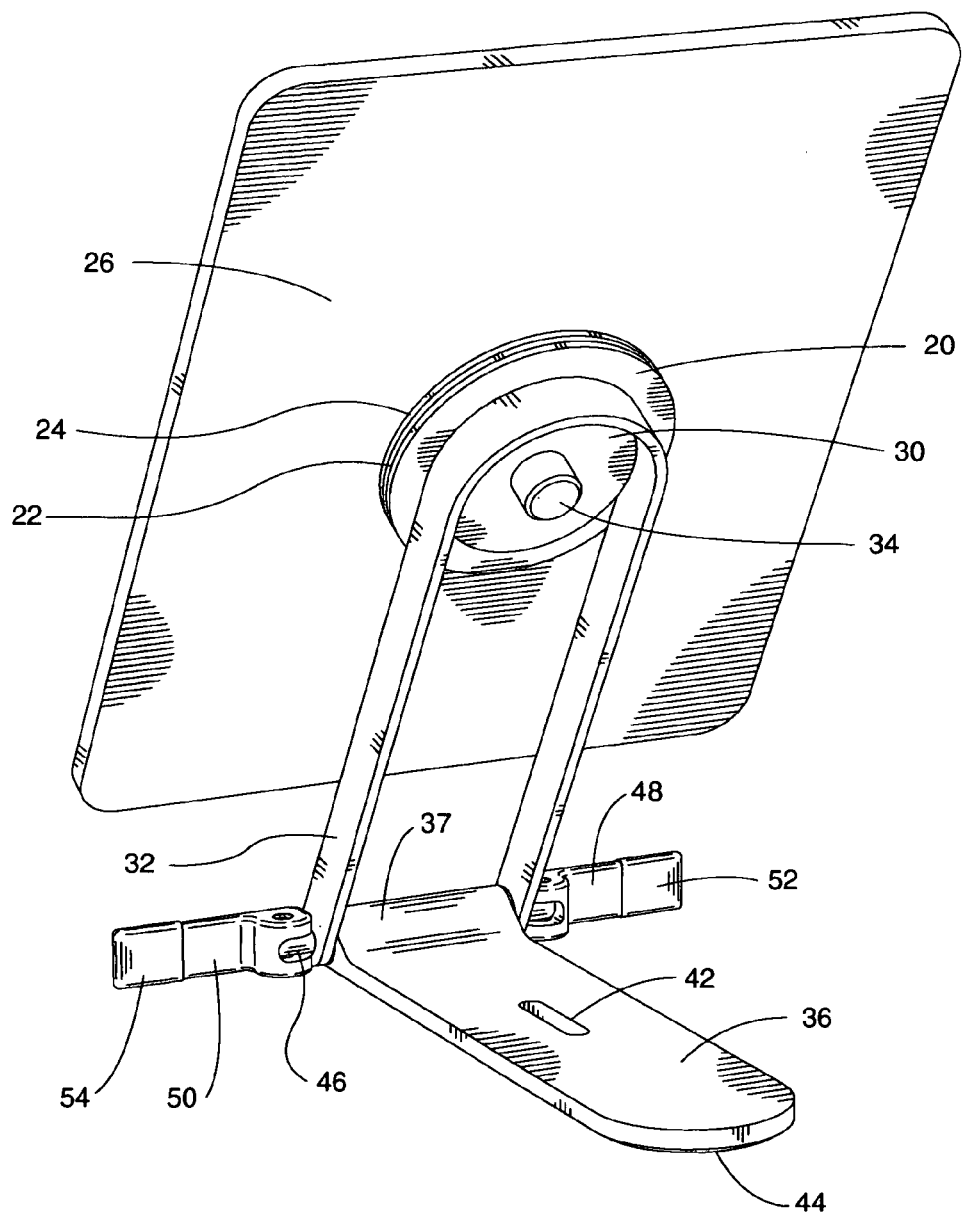
FIG. 2 illustrates a perspective rear view of an exemplary embodiment of the stand shown resting on a horizontal surface and with an attached tablet computer in a portrait (vertical) orientation and locked in a slightly backward leaning position.
Figure 3:
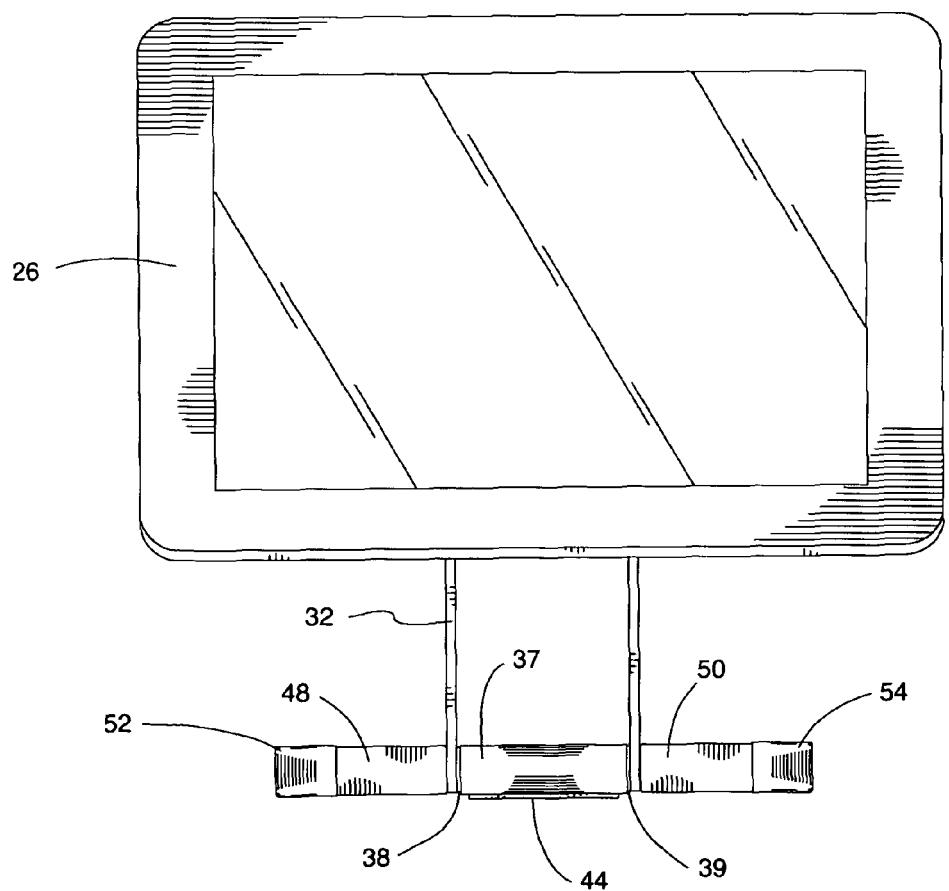
FIG. 3 illustrates an orthographic front view with an attached tablet computer in a landscape (horizontal) orientation and locked in a slightly backward leaning position; in this particular view, the stand is sitting on top of a horizontal surface.
Figure 4:
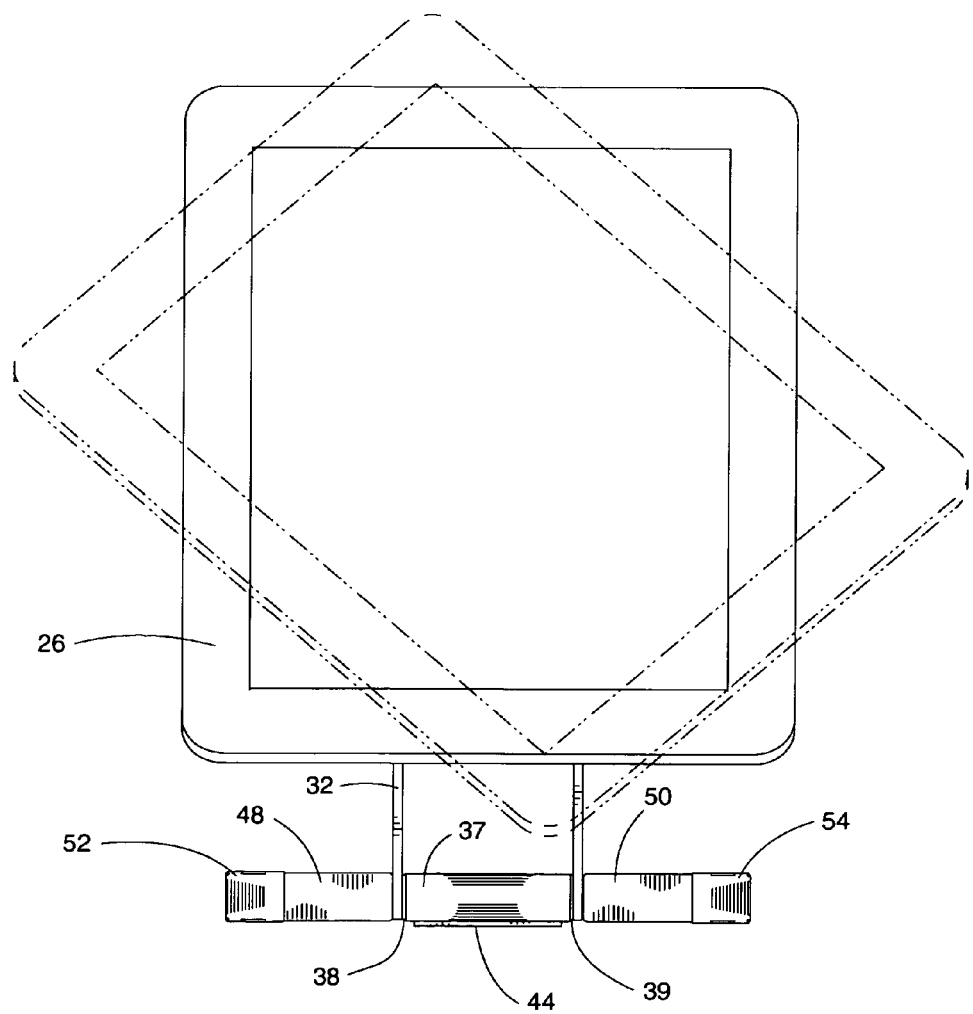
FIG. 4 illustrates an orthographic front view of the stand with an attached tablet computer in a portrait (vertical) orientation and locked in a slightly backward leaning position. There are dashed lines showing the screen rotated half way between a portrait (vertical) and a landscape (horizontal) orientation; in this particular view, the stand is sitting on top of a horizontal surface.
Figure 5:
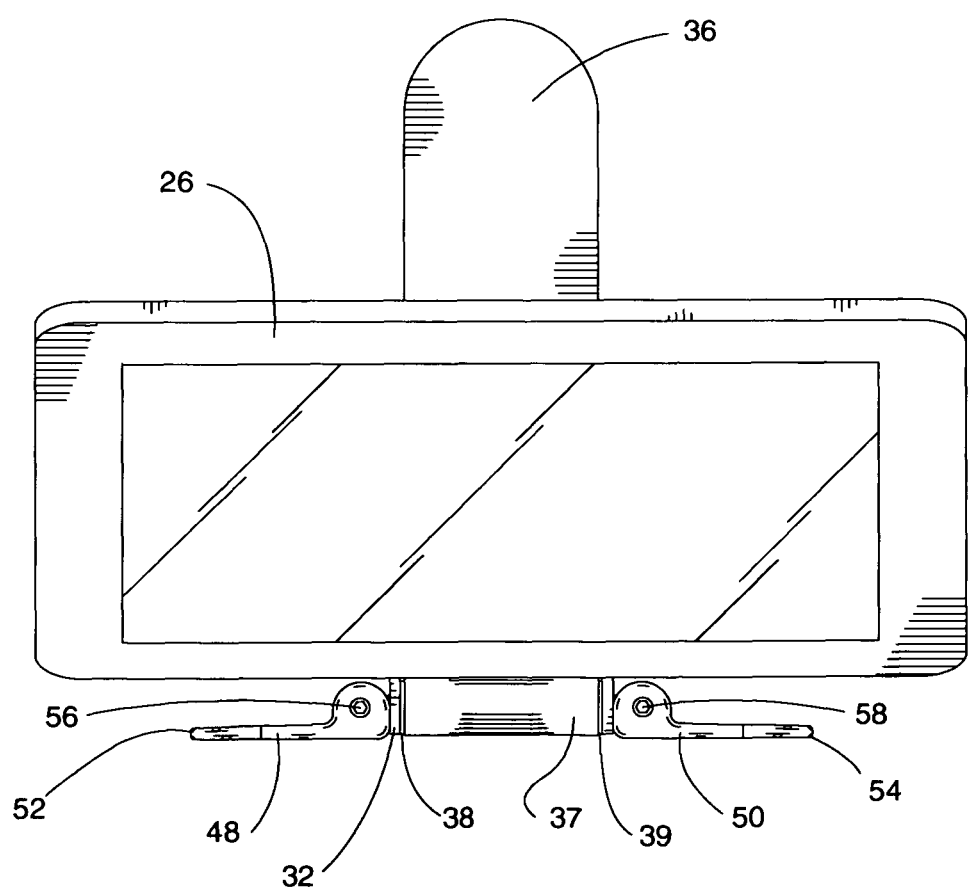
FIG. 5 illustrates an orthographic top view with an attached tablet computer in a landscape (horizontal) orientation and locked in a slightly backward leaning position; in this particular view, the stand is sitting on top of a horizontal surface.
Figure 6:
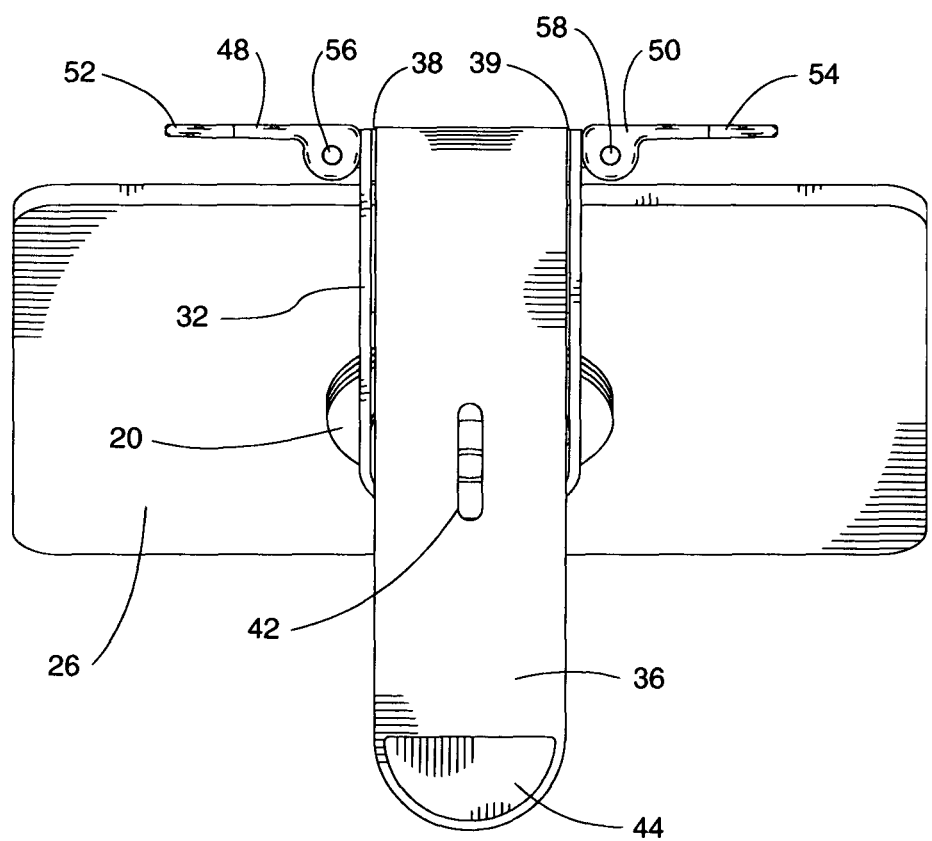
FIG. 6 illustrates an orthographic bottom view of the stand with an attached tablet computer in a landscape (horizontal) orientation and locked in a slightly backward leaning position; in this particular view, the stand is sitting on top of a horizontal surface.
Figure 7:
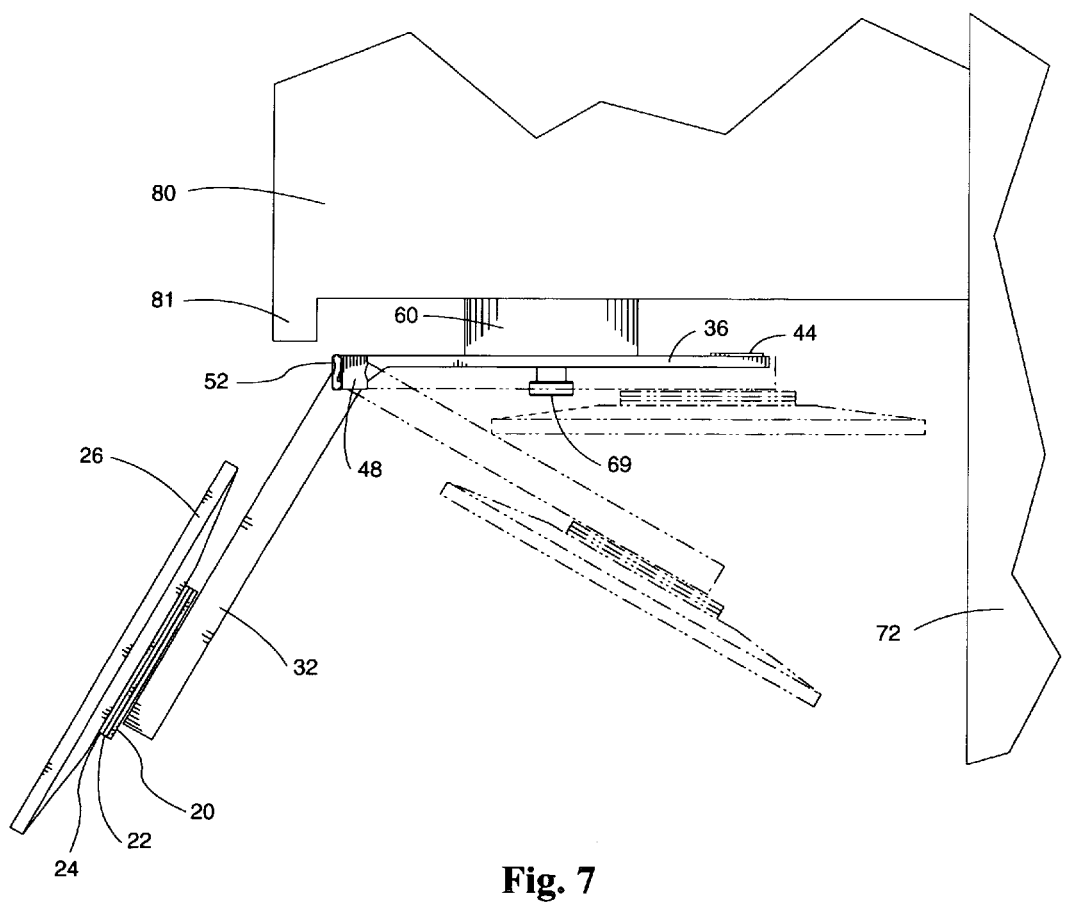
FIG. 7 illustrates an orthographic side view showing the stand mounted to the bottom of a kitchen cabinet; in this view the angle between the hinge member and the base member is greater than 90 degrees and the cam-actuated handles are in the locked/extended position. There are dashed lines showing the stand locked into a partially retracted and a fully retracted position.
Figure 8:
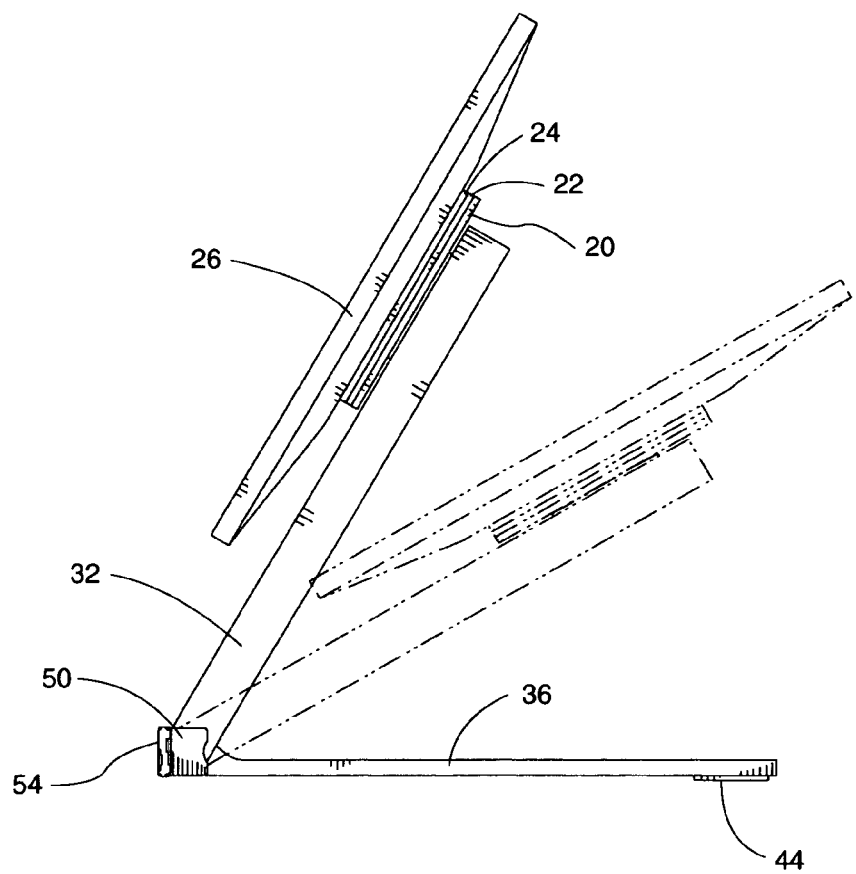
FIG. 8 illustrates an orthographic side view with an attached tablet computer in a landscape (horizontal) orientation and shows the stand sitting on a horizontal surface; in this view the hinge member is shown tilted slightly backwards and locked into position. There are dashed lines showing the hinge member in a more reclined and locked position.
Figure 9:
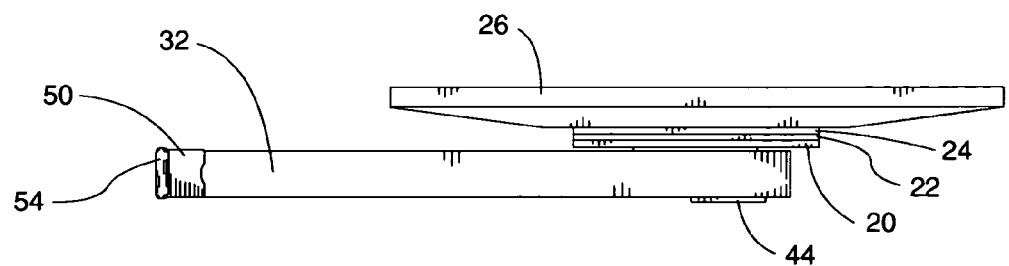
FIG. 9 illustrates an orthographic side view with an attached tablet computer in a landscape (horizontal) orientation and shows the stand sitting on a horizontal surface; in this view the hinge member is shown fully reclined and locked into position.
Figure 10:
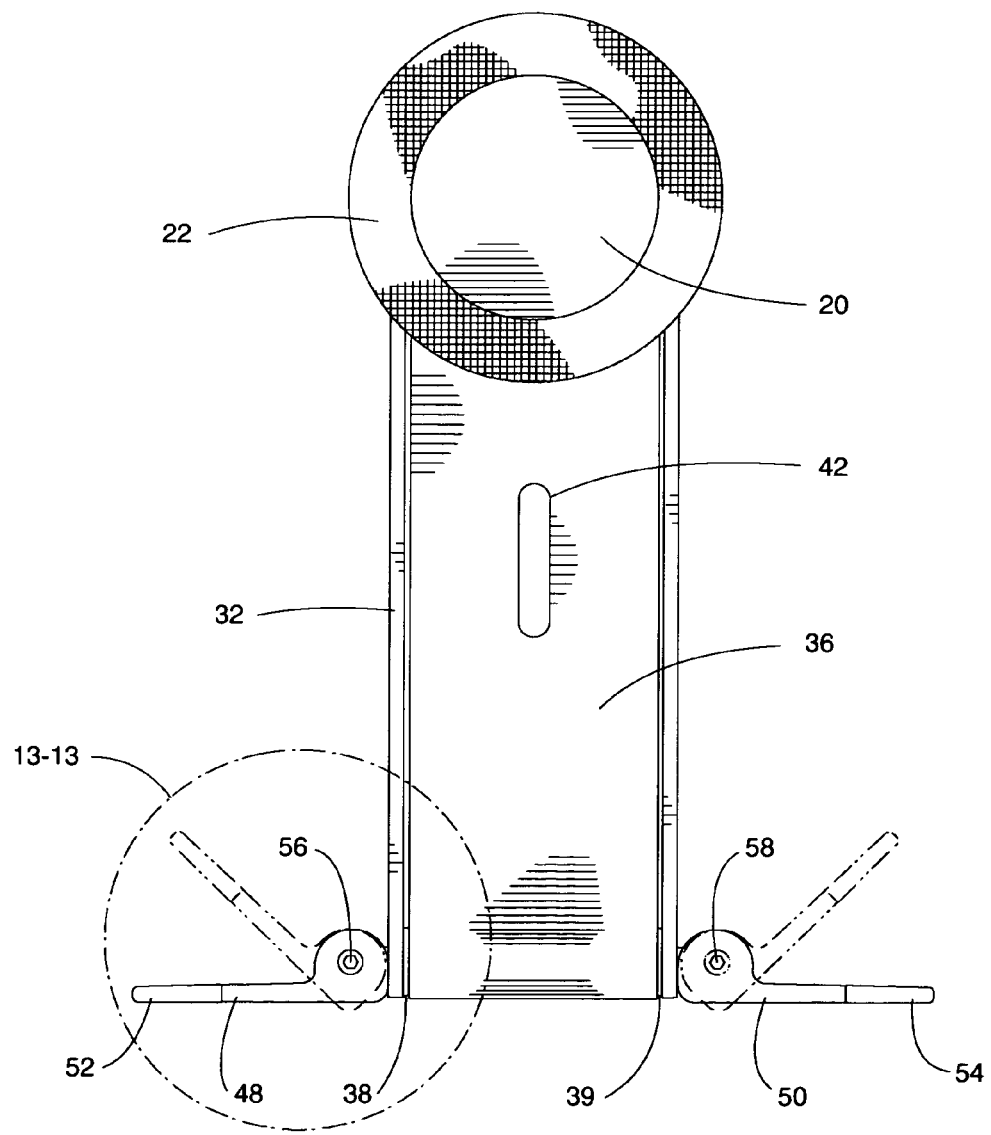
FIG. 10 illustrates an orthographic top view of the stand without an attached tablet computer; in this view the hinge member assembly is shown tilted down all the way so that it is laying on the base member. The cam-actuated handles are shown extended outward in a locked position. There are dashed lines showing the cam-actuated handles rotated half way between the locked and the unlocked position.
Figure 11:
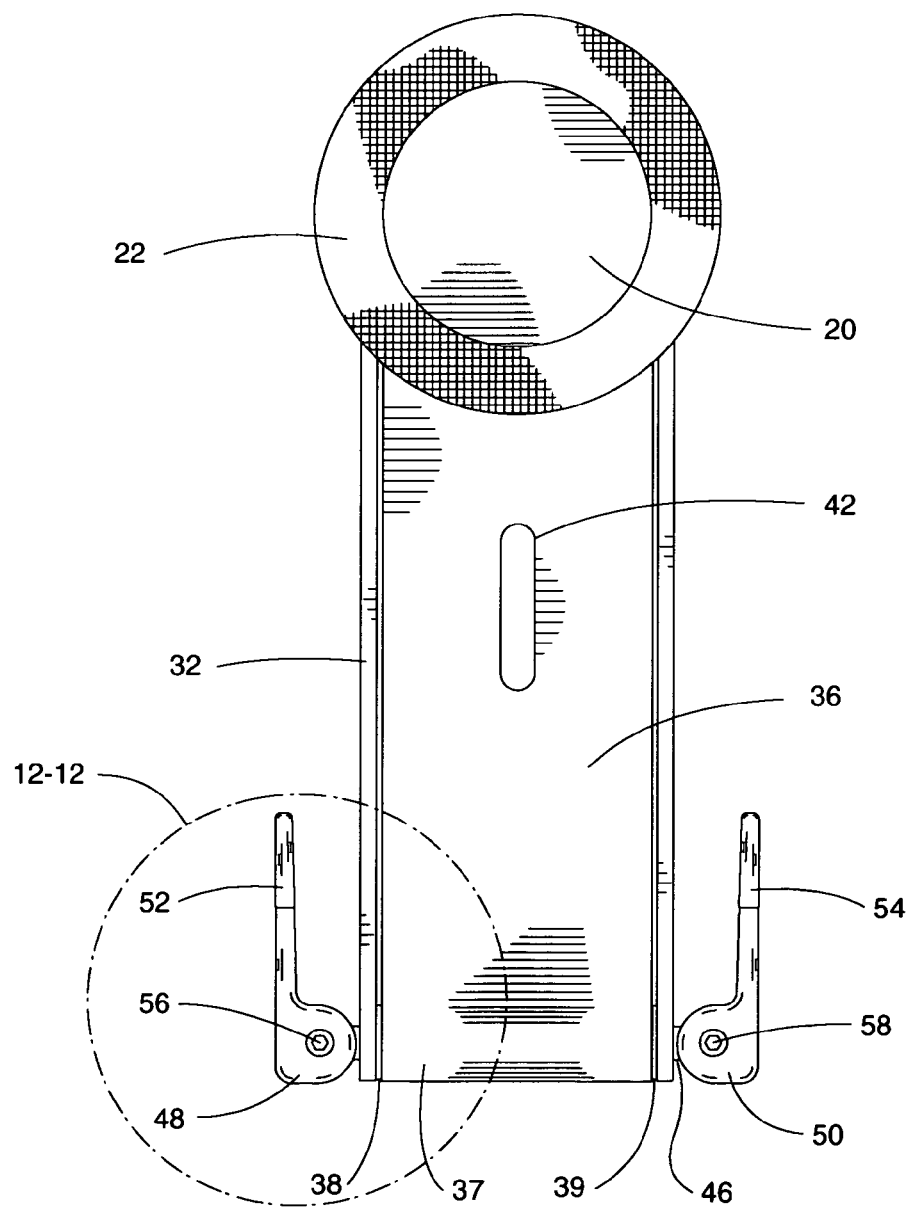
FIG. 11 illustrates an orthographic top view of the stand without an attached tablet computer; in this view the hinge member assembly is shown tilted down all the way so that it is laying on the base member. The cam-actuated handles are shown folded inward in an unlocked position.
Figure 15:
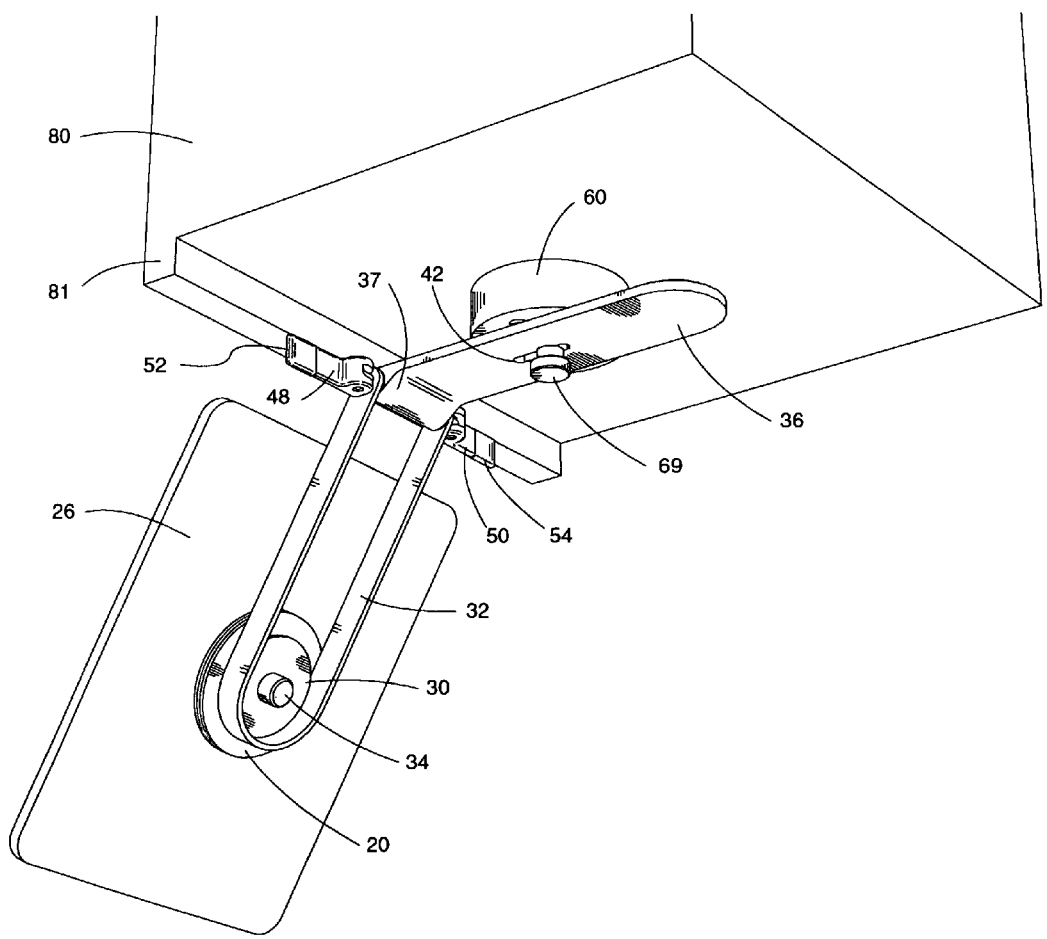
FIG. 15 illustrates a perspective view of the stand mounted to the bottom of a kitchen cabinet; in this view the angle between the hinge member and the base member is greater than 90 degrees and the pivot arms are in the locked/extended position.
Figure 16:
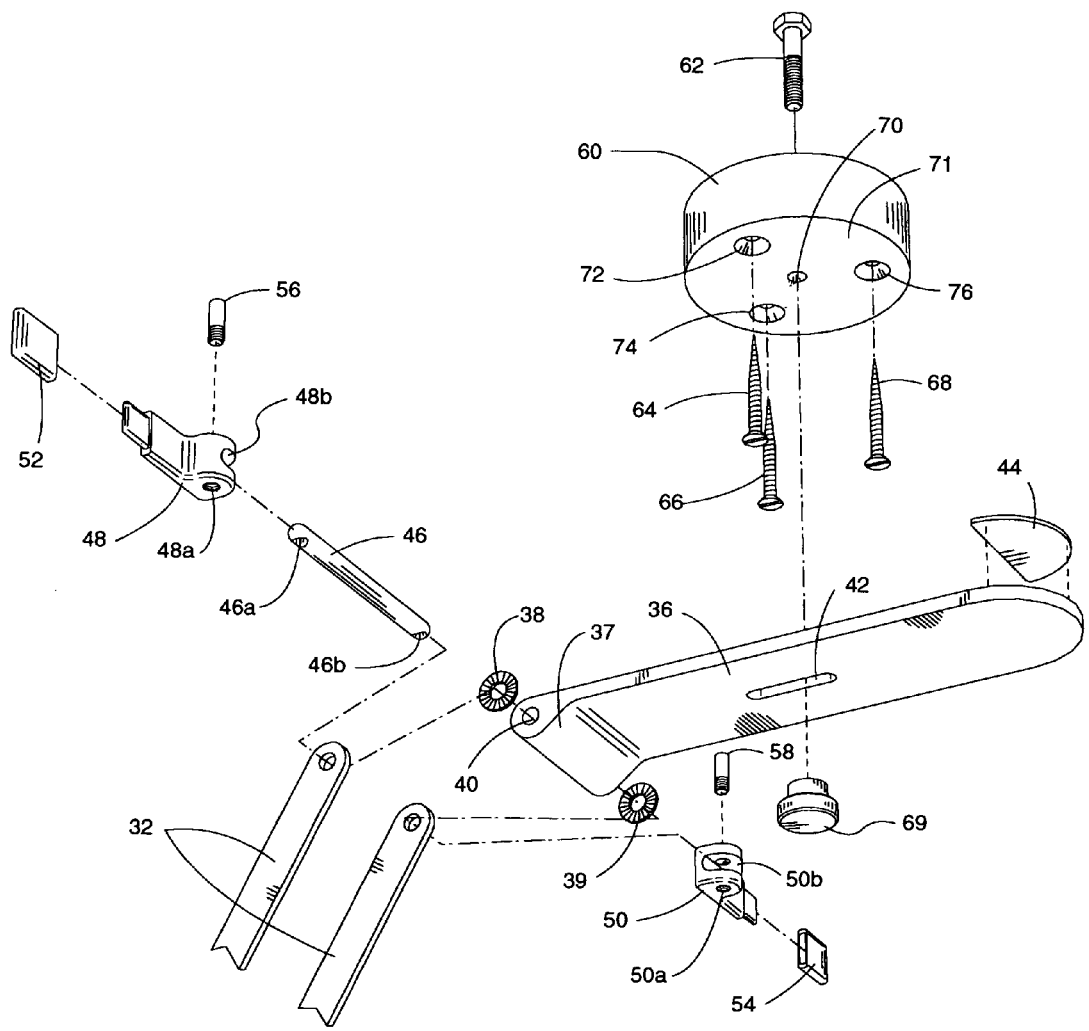
FIG. 16 illustrates a partially exploded perspective view, taken from the same vantage point as FIG. 15, showing the lower portion of the stand and the components of the base mount.
Figure 17:
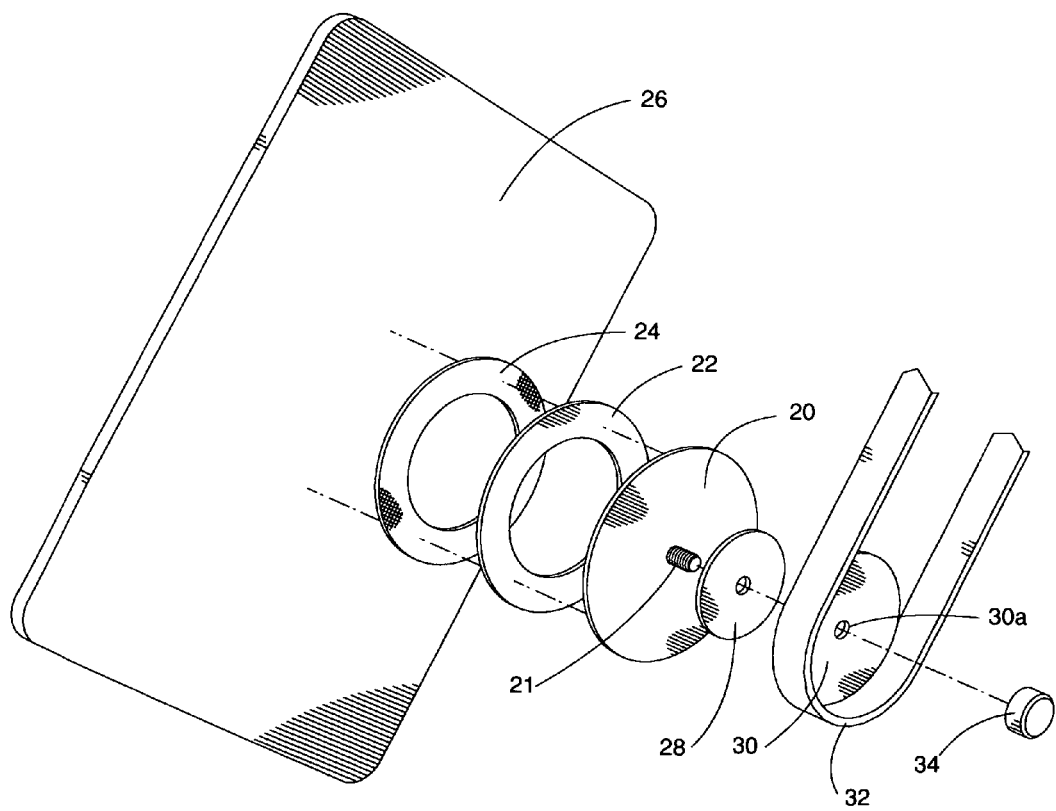
FIG. 17 illustrates a partially exploded perspective view, taken from the same vantage point as FIG. 15, showing the upper portion of the stand and a tablet computer.
Figure 18:
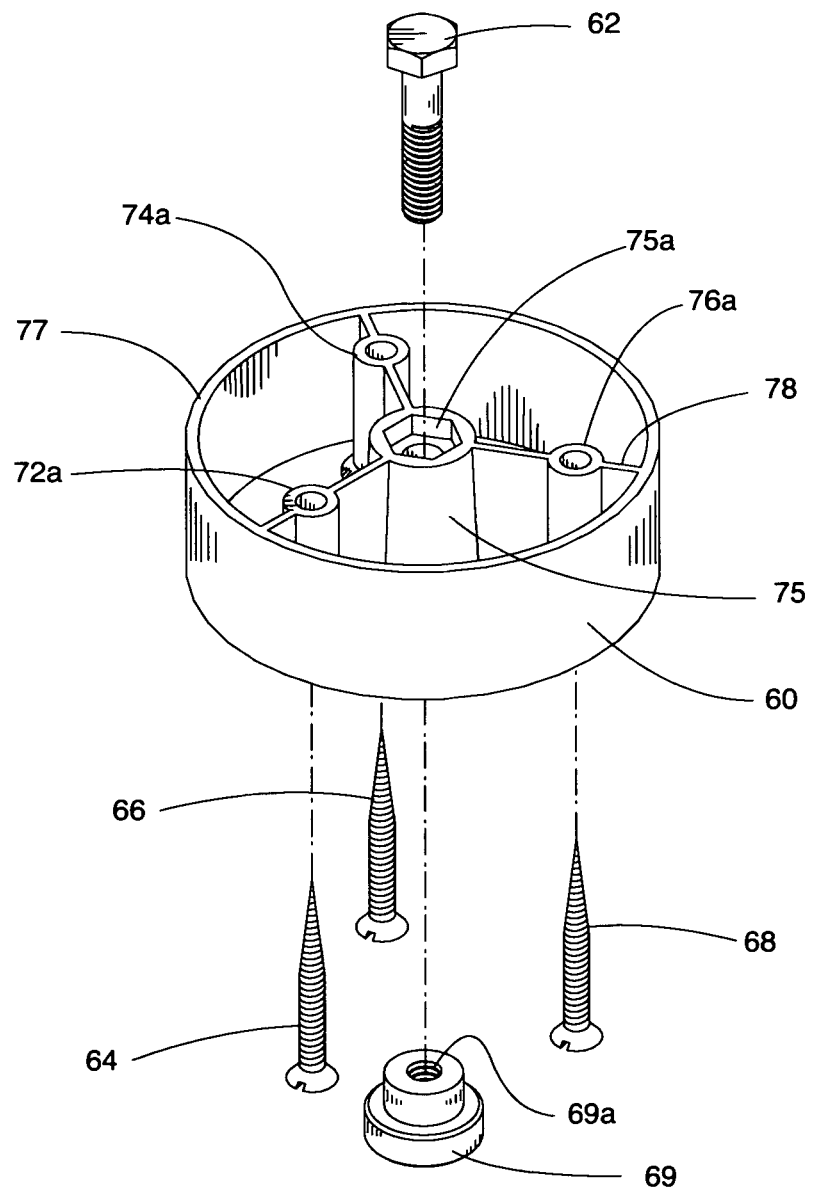
FIG. 18 illustrates a partially exploded view of the base mount assembly.

Referring to the drawings and initially to perspective FIGS. 1, 2, and 15, and to exploded FIGS. 16-18, a multi-positional stand and under cabinet mount for a tablet computer (of prior art) in accordance with the preferred embodiment of the present invention comprising a base member 36, a hinge member 32, a mounting plate 20, 2 cam-actuated handles 48 and 50, a hinge pin 46, 2 partially-threaded locking pins 56 and 58, and a base mount 60. Base member 36 can be solid and substantially flat and approximately 4 times as deep as it is wide. The sides of base member 36 are parallel near the front. The front area of base member 36 has a raised front area 37 that is cylindrical in shape and is oriented with its center axis going side to side. The raised front area 37 can flow smoothly into the flat shape of base member 36 and is oriented so that the bottom most point of thick area 37 and the bottom of base member 36 are on the same plane. Raised front area 37 of base member 36 has a through hole 40 that passes horizontally (and left to right) through base member 36. Raised front area 37 can be the same width as the rest of base member 36. The back edge of base member 36 can be rounded. The left and right sides of thick area 37 must be flat and parallel with each other. Base member 36 has a slot 42 that cuts through its top and bottom surfaces. Slot 42 is approximately 5 times as long as it is wide and runs lengthwise on the top and bottom surface of base member 36. Slot 42 is located in the middle third of the top/bottom surface of base member 36 and is exactly centered left to right on base member 36. Base member 36 has a soft pad 44 that is attached to the back end of its bottom surface. Soft pad 44 is designed to separate and protect a horizontal work surface from being scratched by base member 36 when the stand is sitting on said surface.

Hinge member 32 can be a solid bar that is bent, formed, or molded into a "U" shape. The bent portion of said "U" shape forms the top portion of hinge member 32. The ends of said "U" shape form the bottom portion of hinge member 32. Hinge member 32 has flat, parallel inside and outside surfaces that are designed to interface with (fit around) the side and back edges of base member 36. The bottom most inside and outside surfaces of hinge member 32 must be flat and parallel and are as wide as the left and right side surfaces of raised front area 37 of base member 36. The left and right bottom portions of hinge member 32 have hinge pin holes 32a and 32b that cut through the outer and inner surfaces of hinge member 32 and are cut about the same axis that is centered front to back on hinge member 32. The bottom edges of hinge member 32 can be rounded. Hinge pin 46 is solid and cylindrical in shape and can have rounded ends. When hinge pin 46 is passed through hinge pin hole 32a of hinge member 32 and into hole 40 of base member 36 and through hinge pin hole 32b of hinge member 32, then hinge member 32 can pivot about hinge pin 46 and base member 36. The ends of hinge pin 46 extend out of hinge pin holes 32a and 32b of hinge member 32 and can pivotally couple to cam-actuated handles 48 and 50. Hinge pin 46 has 2 holes 46a and 46b located close to each end of hinge pin 46. The holes 46a and 46b cut through hinge pin 46 perpendicular to (and through) an axis that runs lengthwise, through the center of hinge pin 46. Furthermore, the central axis of holes 46a and 46b, of hinge pin 46, are parallel.

Cam-actuated handles 48 and 50 can be solid and of cast or machined material, and pivot about partially-threaded locking pins 56 and 58 respectively, which pass through partially threaded holes 48a and 50a in cam-actuated handles 48 and 50 respectively. Partially-threaded holes 48a and 50b can be partially-threaded, likewise, partially-threaded locking pins 56 and 58 can be partially threaded correspondingly. One end of both partially-threaded locking pins 56 and 58 can have a hexagonal socket head for insertion or removal into partially-threaded holes 48a and 50a of cam-actuated handles 48 and 50 with a hex wrench of prior art. The ends of hinge pin 46 fit into cut out sections 48b and 50b of cam-actuated handles 48 and 50 which allow cam-actuated handles 48 and 50 to freely rotate 90 degrees about, and without binding with, hinge pin 46. Cam-actuated handles 48 and 50 have cam surfaces that engage with the outside surfaces of the bottom portion of hinge member 32.

Figure 12:
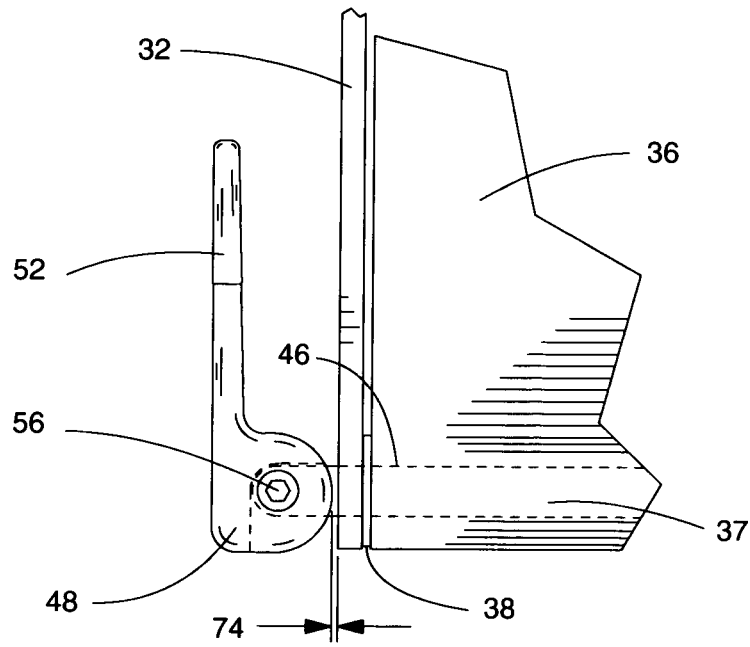
FIG. 12 illustrates a close up view of the lower left corner of FIG. 10.
Figure 13:
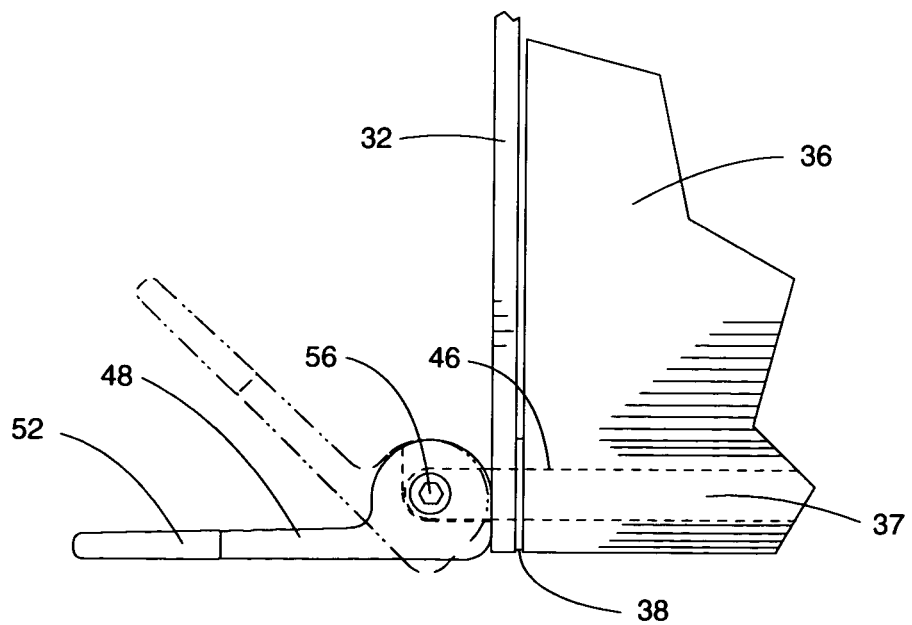
FIG. 13 illustrates a close up view of the lower left corner of FIG. 11.
Figure 14:
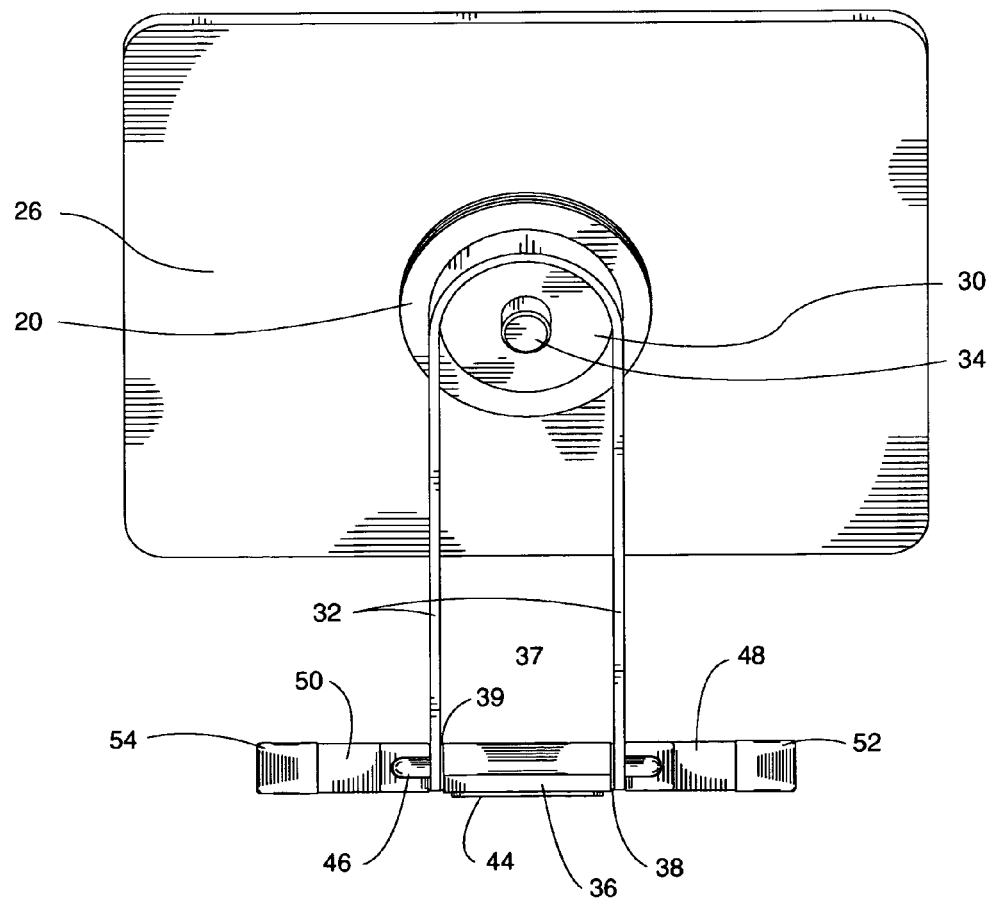
FIG. 14 illustrates and orthographic back view of an exemplary embodiment of the stand shown resting on a horizontal surface and with an attached tablet computer in a landscape (horizontal) orientation and locked in a slightly backward leaning position.

FIG. 12 shows cam-actuated handle 48 rotated towards hinge member 32 and illustrates an unlocked position whereby there is a small space 74 between cam-actuated handle 48 and hinge member 32. FIG. 13 shows cam-actuated handle 48 rotated away from (perpendicular to) hinge member 32 and illustrates a locked position whereby there is no space between cam-actuated handle 48 and hinge member 32 and there is sufficient pressure applied so that hinge member 32 is locked into a static position with respect to base member 36. It should be noted that if only 1 cam-actuated handle is in a locked position there should still exist the possibility of rotation between hinge member 32 and base member 36. Hinge member 32 and base member 36 should be locked into position with respect to each other when both cam-actuated handles are in a locked position. Pivot handles 48 and 50 can have soft caps 52 and 54 located toward their outer handle area (the ends farthest away from the center of pivot).

Referring to FIG. 17, hinge member 32 can have a flat face 30 located towards its top end. The front of flat face 30 can be flush with the front edge of hinge member 32. Flat face 30 has a hole 30a that is centered left to right on flat face 30 and can coincide with the center of curvature of the bend at the top of hinge member 32. Mounting plate 20 can be flat, or almost flat, and solid and larger than flat face 30, but smaller than the back surface of a tablet computer of prior art. The shape of the face of mounting plate 20 can be round. Mounting plate 20 has a front surface to which the hook side 22 of a hook-and-loop type fastener material of prior art can be applied. Mounting plate 20 can have a threaded stud 21 solidly attached to, and centered on, its back surface. Threaded stud 21 can pass through hole 30a on flat face 30 and be captured with a lock nut 34. Lock nut 34 can be fastened to threaded stud 21 so that it allows mounting plate 20 to still rotate with respect to flat face 30 of hinge member 32. Lock nut 34 can be a standard hexagonal lock-nut of prior art, or, a cylindrical blind lock cap as shown in FIG. 17. To reduce friction, a washer 28 can be placed in between mounting plate 20 and flat face 30 and be captured by threaded stud 21. The loop side 24 of a hook-and-loop type fastener material of prior art can be applied to the center of the back of a tablet computer 26. The loop side 24 can mount to the hook side 22 therefore allowing a tablet computer 26 to be attached to and centered on mounting plate 20. Furthermore, when the tablet computer 26 is mounted in this way, tablet computer 26 can be rotated by the user. Lock nut 34 can be tightened to the point that it easily turns by hand pressure, but is not too loose that it allows an attached tablet computer to continue rotating after being released. Since the tablet computer 26 is mounted at the center of its back (assuming this is the center of gravity), it should only rotate when a user manipulates tablet computer 26 and then tablet computer 26 should stay in position after the user is finished manipulating it.

Referring to FIGS. 7, 15, 16 and 18, there is a base mount 60 which is of injection-molded material, having a cup-like shape and have a top edge 77 and a bottom surface 71. Base mount 60 is slightly taller than a standard front edge 81 on the bottom of a kitchen cabinet 80 of prior art and approximately as wide as base member 36. Base mount 60 is shown with 3 counter sunk through holes 72,74 and 76 which pass through 3 sleeves 72a, 74a, and 76a respectively. Base mount 60 can be attached to a flat surface 80 with 3 screws 64, 66 and 68 which pass through through holes 72, 74, and 76 and into flat surface 80. Located in the center of base mount 60 is a central sleeve 75 having a through hole 70 that passes all the way through central sleeve 75. There is a recessed area 75a at the top of sleeve 75 that is designed to surround the hexagonal head of bolt 62. The head of bolt 62 fits into recessed area 75a and the threaded stud of bolt 62 fits into and protrudes from hole 70 on bottom surface 71. There can be webbing 78 connecting sleeves 76a, 76b, and 76c to the outer surface of 60 and to sleeve 75 to add strength. When base mount 60 is therefore attached to the bottom of kitchen cabinet 80, bolt 62 can not move or rotate with respect to base mount 60. In order to mount the stand upside down and on the underside of a cabinet or shelf, the bottom surface of base member 36 can interface with and be held against bottom surface 71 of base mount 60 with a threaded attachment knob 69 which screws onto the end of bolt 62 which passes through slot 42 on base member 36. Threaded attachment knob 69 has a female threaded hole 69a that can thread onto bolt 62. Threaded attachment knob 69 is of large enough diameter so that it can be turned and tightened by the user without the user requiring a tool. Threaded attachment knob 69 can have a knurled surface to assist the user in turning it. The stand, when mounted to the base mount, can be rotated with respect to the base mount about the axis that runs through bolt 62; furthermore, the user can lock the stand into a preferred position by manually tightening threaded attachment knob 69. When bolt 62 of base mount 60 passes through slot 42 of base member 36, then base member 36 can be manually pulled forward or pushed back within the travel range of slot 42 and locked into place by manually tightening threaded attachment knob 69. When base mount 60 is attached to the bottom of a cabinet or surface and the stand is attached to base mount 60 and a tablet computer 26 is attached to the stand, then the tablet computer can be viewed, touched, manipulated, rotated, turned, pulled forwards or backwards, swung forward or swung backwards, or retracted by hand without hitting wall 72 of FIG. 7.

What is claimed is:

1. A multi-positional stand and under cabinet mount for a tablet computer comprising:
   (a) a mounting plate of rigid material and being substantially flat and of sufficient size for temporarily joining to the back of a tablet computer,
   (b) a means for temporarily joining said mounting plate to the center of the back surface of said tablet computer whereby a user can easily detach or re-attach said tablet computer to or from said mounting plate without requiring a tool,
   (c) a hinge member having a top portion and a bottom portion,
   (d) a means for rotationally joining said mounting plate to the front of said top portion of said hinge member whereby allowing a user to manually rotate the face of said attached tablet computer about an axis running perpendicular to and centered on said face of said tablet computer thereof,
   (e) a base member having a front end and a flat bottom surface,
   (f) 2 partially-threaded locking pins,
   (g) a hinge pin about which said hinge member can rotate,
   (h) 2 lock washers which provide friction between said hinge member and said base member,
   (i) a means for pivotably connecting the bottom portion of said hinge member to the front end of said base member whereby said base member remains in a fixed position while said hinge member can be in anyone of an infinite number of angular positions with respect to said base member within a predetermined range of motion rotating about said hinge pin whereby the recline angle of an attached tablet computer can be changed,
   (j) 2 cam-actuated handles,
   (k) a means for manually locking and unlocking the position of said hinge member with respect to said base member in anyone of an infinite number of angular positions within said range of motion of said hinge member and said base member by the manipulation of said 2 cam-actuated handles whereby the screen of said attached tablet computer can be viewed, touched, rotated, pivoted and angularly locked in ways and in positions that are useful to a user,
   (l) a base mount having a top edge and a bottom surface,
   (m) a means for fixedly attaching said top edge of said base mount to the bottom of a flat surface, such as a shelf, or, the bottom or side of a cabinet,
   (n) a means for temporarily, rotationally, and slide-ably mounting said bottom surface of said base member of said stand to said bottom surface of said base mount whereby said attached tablet computer can be viewed, manipulated, rotated, pivoted, tilted, swung forward, fully retracted under a cabinet or shelf and angularly locked in ways and in positions that are useful to a user.

2. The multi-positional stand and under cabinet mount of claim 1 wherein said mounting plate is round and has a front surface and a back surface and further comprises a threaded stud which is fixedly attached to and centered on said back surface of said mounting plate so that the central axis of said threaded stud is perpendicular to said back surface of said mounting plate whereby said mounting plate can rotate around said central axis of said threaded stud.

3. The multi-positional stand and under cabinet mount of claim 1 wherein said hinge member has an elongated "U" shape and has flat inside and outside surfaces wherein the bent portion of said elongated "U" shape defines said top portion of said hinge member while the ends of said "U" shape form said bottom portion of said hinge member and said hinge member further comprises:
   (a) a flat face which is fixedly attached to and substantially flush with the front edge of said top portion of said hinge member,
   (b) a hole which passes through the center of said flat face of said hinge member,
   (c) 2 hinge pin holes located on the flat left side and flat right side of said bottom portion of said hinge member so that said 2 hinge pin holes share the same central axis and can receive and rotate around said hinge pin of claim 1.

4. The multi-positional stand and under cabinet mount of claim 1 wherein said base member is of solid material and has a raised front area and has substantially flat middle and back areas and has a rounded back edge so that the outline of said base member matches the inside outline of, and is slightly smaller than, said hinge member allowing said hinge member to fold down on top of, and around, said base member and said base member further comprises:
- (a) a horizontally running hole, oriented side to side through said raised front area of said base member to allow said hinge pin of claim 1 to pass through said horizontally running hole,
- (b) flat, parallel surfaces on the left and right side of said raised front area which are perpendicular to the axis running through said horizontally running hole of said base member,
- (c) a slot oriented depth-wise and piercing through and centered left to right on the top and bottom surfaces of said middle area of said base member, the axis of said slot being perpendicular to the top and bottom faces of said base member,
- (d) a soft flat pad of semi-circular shape which is permanently attached to the back end of the bottom surface of said base member and located substantially close to its said rounded back edge whereby said soft pad protects a horizontal surface from scratches and assists in holding said stand in place by creating additional friction between said stand and said horizontal surface.

5. The multi-positional stand and under cabinet mount of claim 1 wherein said 2 partially-threaded locking pins are cylindrical in shape and each comprise:
- (a) a bottom threaded portion,
- (b) a middle and top non-threaded portion,
- (c) a hex-type socket head top whereby a hex wrench can be inserted into said socket head top whereby turning said locking pin.

6. The multi-positional stand and under cabinet mount of claim 1 wherein said hinge pin is cylindrical in shape and comprises:
- (a) 2 rounded ends,
- (b) 2 through holes, each located near one of said 2 rounded ends of said hinge pin running vertically through and oriented perpendicular to and intersecting with an axis running through the length of said hinge pin whereby said middle, non-threaded portion of said partially threaded locking pins can fit inside said 2 through holes of said hinge pin allowing for rotation between said hinge pin and said partially-threaded locking pins.

7. The multi-positional stand and under cabinet mount of claim 1 wherein said 2 cam-actuated handles are of solid, cast or machined material each further comprising:
- (a) a cam surface,
- (b) a partially-threaded through hole, which is vertically oriented, which can receive said 2 partially-threaded locking pins around which said cam-actuated handles can pivot,
- (c) a cavity to receive and clear one end of said hinge pin as said end of said hinge pin rotates about a 90 degree arc around the center of one of said 2 through holes of said hinge pin,
- (d) an outer handle area which can be grasped and manipulated by a user,
- (e) a soft cap fixedly attached to said outer handle area of said cam-actuated handles whereby said soft cap of said cam-actuated handles protect the horizontal surface which the stand is resting on from scratches and aids the user in gripping said 2 cam-actuated handles.

8. The multi-positional stand and under cabinet mount of claim 1 wherein said 2 lock washers fit around said hinge pin of claim 1 and are sandwiched between said flat, parallel surfaces on the left and right side of said raised front area of said base member and the flat inside surfaces of the bottom portion of said hinge member, whereby creating friction between said hinge member and said base member when urged towards each other by said cam-actuated handles.

9. The multi-positional stand and under cabinet mount of claim 1 wherein said base mount is of injection molded material and is cup-like in shape and has an open top, a top edge, a side wall, and is about as wide as said base member and slightly taller than the front lip on the bottom of a typical kitchen cabinet and further comprises:
- (a) a central sleeve which passes from the center of said bottom surface of said base mount and extends up to and level with said top edge of said base mount, said central sleeve further comprising a hollow cavity being shaped to fit a hex-head, threaded screw with the top of said screw entering from above and being flush with the top of said central sleeve,
- (b) a hex-head, threaded screw, which enters said hollow sleeve from the top whereby the bottom, threaded portion of the screw protrudes out of said bottom surface of said base mount and whereby the head of said screw is captured by said hollow sleeve so that said screw can not turn and whereby when said base mount is fixedly attaching to the bottom of a flat surface, such as a shelf, or, the bottom or side of a cabinet, said hex-head, threaded screw cannot move,
- (c) at least 2 outer sleeves which pass from said bottom surface of said base mount and extend up to and level with said top edge of said base mount which are positioned between said central sleeve and said side wall of said base mount
- (d) said at least 2 outer sleeves further each comprising a countersunk through hole in which the countersunk portion is on said bottom surface of said base mount
- (e) webbing which connects said side walls of said base mount to said at least 2 countersunk sleeves and further connects said at least 2 countersunk sleeves with said central sleeve whereby adding strength to said base mount.

10. The multi-positional stand and under cabinet mount of claim 1 wherein said means for temporarily joining said mounting plate to said center of the back surface of said tablet computer further comprises:
- (a) a hook side of a two-part, hook and loop, fastening material of prior art, which is adhered to the front surface of said mounting plate,
- (b) a loop side of a two-part hook and loop, fastening material of prior art, which is attached to the center of the back of said tablet computer whereby said tablet computer can be repeatedly attached and unattached to the front of said mounting plate by the user whenever it is convenient to do so.

11. The multi-positional stand and under cabinet mount of claim 1 wherein said means for rotationally joining said mounting plate to the front of said top portion of said hinge member further comprises:
- (a) a washer which has a hole and is sandwiched between said back surface of said mounting plate and said flat face of said hinge member whereby said threaded stud of said mounting plate passes through said hole of said washer, and through said hole of said flat face of said hinge member,
- (b) a locknut which can be cylindrical in shape and which threads onto and stays in a fixed position with the end of said threaded stud of said mounting plate whereby said mounting plate can freely rotate about said flat face of said hinge member with limited friction and without wobbling or falling off, and without becoming loose.

12. The multi-positional stand and under cabinet mount of claim 4, wherein said means for pivotably connecting the bottom portion of said hinge member to the front end of said base member wherein:
   (a) said hinge pin passes through said horizontally running hole of said base member,
   (b) said hinge pin further passes through said hinge pin holes of said hinge member,
   (c) said partially-threaded through holes of said cam-actuated handles align with said through holes of said hinge pin,
   (d) said partially-threaded locking pins screw into said partially threaded through holes of said cam-actuated handles, passing through said hinge pin holes of said hinge pin whereby allowing said cam-actuated handles to pivot within a 90° range around the axis running through the length of said partially-threaded locking pins,
   (e) when said cam-actuated handles are rotated from perpendicular with to parallel with said axis running through the length of said hinge pin, said cam surface of said cam-actuated handles gradually engage with the outside flat surface of said bottom portion of said hinge member whereby urging said bottom portion of said hinge member onto said lock washers and further urging on to said flat, parallel surfaces on the left and right side of said raised front area of said base member whereby, when both cam-actuated handles are fully parallel with said axis running through the length of said hinge pin then the angular position of said hinge member and said base member is locked,
   (f) when said cam-actuated handles are fully parallel with said axis running through the length of said hinge pin and are in a locked position, then said cam-actuated handles stabilize said base member when said base member is resting on a horizontal flat surface such as a table or a counter,
   (g) when said cam-actuated handles are manually rotated 90° perpendicular to the axis running through the center of said hinge pin, and thereby the front faces of said cam-actuated handles are parallel with the sides of said base member, then the angular position of said hinge member and said base member is unlocked,
   (h) when said cam-actuated handles are in the unlocked position, said hinge member and said base member can be rotated on top of each other facilitating a compact, portable orientation,
   (i) when at least one of said cam-actuated handles are in the unlocked position then the angular position of said hinge member and said base member can travel in anyone of an infinite number of angular positions with respect to each other within an angular range from 0° to at least 180°.

13. The multi-positional stand and under cabinet mount of claim 1 whereby said means for fixedly attaching said top edge of said base mount to the bottom of a flat surface, such as a shelf, or, the bottom or side of a cabinet, further comprises at least 2 screws whereby said at least 2 screws can pass through said countersunk through holes of said base member and screw into the bottom of said flat surface of said shelf, or, said cabinet whereby attaching said base mount to said surface with the heads of said at least 2 screws flush with or slightly recessed from said bottom surface of said base mount.

14. The multi-positional stand and under cabinet mount of claim 1 wherein said means for temporarily, rotationally, and slide-ably mounting said bottom surface of said base member of said stand to said bottom surface of said base mount further comprises a threaded attachment knob, said threaded attachment knob comprising a threaded hole on one end and an enlarged head on the other end, said enlarged head of said threaded attachment knob being large enough and textured enough to be gripped and tighten by hand whereby the bottom surface of said base member can be temporarily attached to the bottom surface of said base mount by passing said hex-head, threaded screw of said base mount through said slot of said base member and the end of said hex-head, threaded screw being captured by said threaded attachment knob so that said base member is temporarily fixed to said base mount whereby the user can rotate left or right and slide front or back said stand with respect to said base mount and then fully tightened threaded attachment knob and lock said stand on said base mount into a preferred position.

* * * * *